Oct. 5, 1937.   R. M. JAUSSAUD   2,095,136
SPHERICAL PLUG COCK
Filed June 29, 1936
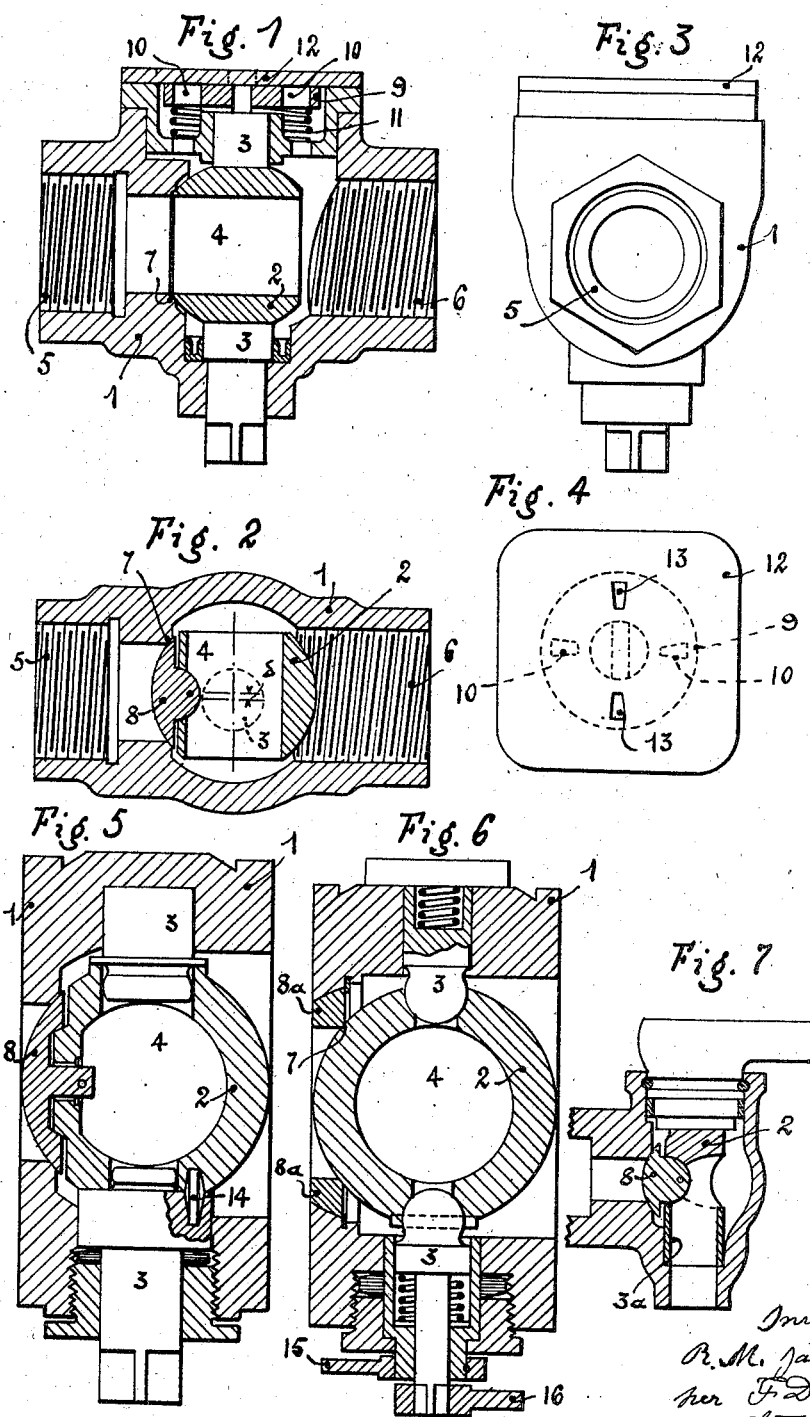

Patented Oct. 5, 1937

2,095,136

UNITED STATES PATENT OFFICE 2,095,136

SPHERICAL PLUG COCK

Robert Maurice Jaussaud, Paris, France

Application June 29, 1936, Serial No. 88,009
In France July 10, 1935

2 Claims. (Cl. 251—91)

The object of the present invention is a plug cock characterized by a spherical plug revolving round an eccentric axle, so that in the "off" position, a closure member pivoted to the plug fits into a seat and has close fitting contact therewith to provide a tight closure. To open the cock, the plug is given a quarter-turn, thus connecting the inlet and the outlet of the valve casing by means of a bore formed through the plug and preferably of the same diameter as the inlet.

The connecting, pivot-mounted part may consist in a spherical cap, pivotally connected to the plug which it thus completes, or in a ring formed with a spherical seat, pivot-mounted on the inlet-pipe and cooperating with the spherical plug which it thus completes.

It is also desired to provide a cock including a drain allowing emptying of an apparatus which has been filled and the cock shut off. It is further desired to devise a certain displacement of the axle eccentric to the plug in order to ensure proper contact of the latter with the seat against which it must fit.

The appended drawing furnishes examples of various methods for the application of this invention. It shows:

Fig. 1.—In longitudinal vertical section, an open cock with pivot-mounted cap and draining device.

Fig. 2.—In horizontal section, the same cock shut.

Fig. 3.—End view, and Fig. 4, diagrammatical view.

Fig. 5.—A view similar to Fig. 1, but with the cock shut by elastic mounting on to the plug.

Fig. 6.—View of cock shut by pivot-mounted ring.

Fig. 7.—A cock of the same type as Fig. 1, open with a hollow axle for the expulsion of the liquid.

Fig. 1 shows the body (1) of the cock in which is located the spherical plug (2), the said plug revolving on two eccentric pivots (3), and being formed with a diametrical bore (4), connecting in "on" position the inlet neck (5) with the outlet neck (6).

In the "on" position, plug 2 is in contact with a concave annular seat 7 at the inner end of the inlet neck, and at the side the plug carries a spherical cap 8 which is pivotally mounted and adapted to fit closely into seat 7 when the plug is given a quarter-turn to the closed position (Fig. 2). Owing to a suitably chosen degree of eccentricity, this quarter-turn of the plug brings cap 8 nearer to seat 7, and once this contact is established, the free oscillation of cap 8 ensures perfect contact and complete tightness.

It is possible to provide for an accessory draining system, as on the cock in Figures 1 to 4, consisting in principle in a plate (9) carried by one of the pivots (3). This plate turns with the plug when the plug is turned by a hand lever applied to the outer end of the other pivot. Plate 9 contains two diametrically opposite openings (10) and is maintained in contact with cap 12 by means of spring 11. Cap 12, which closes the body (1), also has two diametrically opposite openings (13), which register with the openings 10 of the plate when the plug is turned to the "off" position. At that moment, the apparatus filled by the opening of the cock can be emptied or drained.

In Figure 5, the rotation of the plug is governed by eccentric axle 3, which is connected with said plug by elastic devices such as the flexion springs 14 or equivalent means. A checkstop not shown in the drawing may be provided to fix the limits of the movements of the plug to "on" and "off" positions. When the plug is in the "off" position, as in Fig. 5, the elastic parts 14 exert sufficient force upon axle 3 as to permit of bringing into contact plug 2 with the seat 7 and prevent leakage.

Fig. 6 illustrates a cock having a complete spherical plug 2, the cap 8 being replaced by ring 8a pivotally mounted in an appropriate chamber of body 1 which serves as a seat for the plug 2, and performs the same function as cap 8 of the plug shown in Fig. 1. The rotation of plug 2 is effected by a lever 15, and an additional lever 16 displaces the eccentric axle with a view to ensuring contact between the plug and the ring 8a in the "off" position. In this case, two manipulations are necessary one to turn the plug and another to tightly seat the plug against the ring.

The invention may also be easily applied to three-way cocks, the pivot-valve or plug being in this case brought opposite openings spaced from each other 120°. The construction of the cock is so devised as to bring the centres of the plug and its axle into a position approaching that of Fig. 2 when the cock is shut.

Fig. 7 illustrates an embodiment of this invention which is more particularly suitable for domestic purposes. The eccentric axle 3ª is hollow and provides for the expulsion of the fluid when the cock is open.

Naturally, the cock described in the present specification can be formed of any materials desired, and in any dimensions, the instances furnished being more demonstrative and capable of modification as regards structural details.

What I claim is:

1. A cock comprising a casing having an inlet and an outlet, a spherical plug in said casing, an eccentric axle for said plug, a closure member pivoted to said plug at a side thereof, a seat at the inner end of said inlet for engagement by the closure member when the plug is in an "off" position, the plug being formed with a transverse bore of the same diameter as the inlet and connecting the inlet and the outlet when the plug is turned to an "on" position, and an elastic connection between the eccentric axle and the plug.

2. A cock comprising a casing having an inlet at one side and an opposed outlet, a concaved valve seat being formed at the inner end of the inlet and arcuate in cross section, a plug disposed in said body and mounted to turn about a vertically extending eccentric axis, said plug being formed with a transverse diametrically extending passage for registering with the inlet and the outlet when the plug is turned to its "opened" position of adjustment, a flat side face being provided upon the plug to one side of the passage and an opening being formed through the plug between the passage and the flat side face, a closure member disposed against the flat side face and having a hemispherical outer surface for seating against the valve seat and closing the inner end of the inlet when the plug is turned to its "closed" position, a shank for said closure member loosely engaged through said opening and protruding into said passage, and a fastener carried by the protruding end of said shank.

ROBERT MAURICE JAUSSAUD.